United States Patent
Leflaive et al.

(10) Patent No.: US 12,227,702 B2
(45) Date of Patent: Feb. 18, 2025

(54) METHOD FOR CONDUCTING FINISHING HYDRODESULPHURISATION IN THE PRESENCE OF A CATALYST ON A MESO-MACROPOROUS SUPPORT

(71) Applicant: IFP Energies nouvelles, Rueil-Malmaison (FR)

(72) Inventors: Philibert Leflaive, Rueil-Malmaison (FR); Etienne Girard, Rueil-Malmaison (FR); Antoine Fecant, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 60 days.

(21) Appl. No.: 18/036,544

(22) PCT Filed: Nov. 18, 2021

(86) PCT No.: PCT/EP2021/082069
§ 371 (c)(1),
(2) Date: May 11, 2023

(87) PCT Pub. No.: WO2022/112081
PCT Pub. Date: Jun. 2, 2022

(65) Prior Publication Data
US 2024/0010931 A1    Jan. 11, 2024

(30) Foreign Application Priority Data

Nov. 27, 2020 (FR) ........................ 2012321

(51) Int. Cl.
| | |
|---|---|
| *C10G 45/06* | (2006.01) |
| *B01J 21/04* | (2006.01) |
| *B01J 23/755* | (2006.01) |
| *B01J 35/50* | (2024.01) |
| *B01J 35/61* | (2024.01) |
| *B01J 35/63* | (2024.01) |
| *B01J 35/64* | (2024.01) |
| *B01J 35/69* | (2024.01) |
| *B01J 37/02* | (2006.01) |
| *B01J 37/08* | (2006.01) |

(52) U.S. Cl.
CPC ............ *C10G 45/06* (2013.01); *B01J 21/04* (2013.01); *B01J 23/755* (2013.01); *B01J 35/50* (2024.01); *B01J 35/613* (2024.01); *B01J 35/615* (2024.01); *B01J 35/635* (2024.01); *B01J 35/638* (2024.01); *B01J 35/647* (2024.01); *B01J 35/651* (2024.01); *B01J 35/653* (2024.01); *B01J 35/657* (2024.01); *B01J 35/69* (2024.01); *B01J 37/0205* (2013.01); *B01J 37/088* (2013.01); *C10G 2300/202* (2013.01); *C10G 2400/02* (2013.01)

(58) Field of Classification Search
None
See application file for complete search history.

(56) References Cited

U.S. PATENT DOCUMENTS

| | | | |
|---|---|---|---|
| 5,266,300 A | 11/1993 | Harrison | |
| 6,589,908 B1 | 7/2003 | Ginestra et al. | |
| 6,896,795 B2 | 5/2005 | Didillon et al. | |
| 6,972,086 B2 | 12/2005 | Didillon et al. | |
| 7,790,130 B2 | 9/2010 | Kanazirev | |
| 7,807,044 B2 | 10/2010 | Roy-Auberger et al. | |
| 10,562,014 B2 | 2/2020 | Krueger et al. | |
| 2008/0306316 A1* | 12/2008 | Becker | C07C 13/18 585/266 |
| 2012/0193270 A1* | 8/2012 | Inamura | B01J 37/20 502/79 |
| 2015/0314282 A1 | 11/2015 | Bhan et al. | |
| 2018/0346829 A1* | 12/2018 | Sun | C10G 31/08 |
| 2019/0031965 A1* | 1/2019 | Hoehn | C01B 3/56 |
| 2019/0100704 A1* | 4/2019 | Jimenez | C10G 45/04 |
| 2019/0233732 A1* | 8/2019 | Sun | B01D 3/06 |
| 2019/0276749 A1* | 9/2019 | Karthikeyani | B01J 23/72 |
| 2023/0405573 A1* | 12/2023 | Leflaive | B01J 35/66 |
| 2023/0415131 A1* | 12/2023 | Leflaive | B01J 35/651 |
| 2023/0416617 A1* | 12/2023 | Leflaive | B01J 20/3236 |

FOREIGN PATENT DOCUMENTS

| | | |
|---|---|---|
| CA | 2615225 A1 | 6/2008 |
| CN | 109894122 A | 6/2019 |
| FR | 2757084 A1 | 6/1998 |

OTHER PUBLICATIONS

International Search Report PCT/EP2021/082069 dated Jan. 20, 2022 (pp. 1-3).

* cited by examiner

*Primary Examiner* — Tam M Nguyen
(74) *Attorney, Agent, or Firm* — Millen, White, Zelano & Branigan, P.C.; Brion P. Heaney

(57) ABSTRACT

Method for treating a partially desulphurised sulphur-containing hydrocarbon feedstock from a preliminary hydrodesulphurisation step in the presence of a catalyst comprising an active phase comprising a group VII metal and a mesoporous and macroporous alumina support comprising a bimodal distribution of mesopores, wherein: —the volume of mesopores having a diameter greater than or equal to 2 nm and less than 18 nm is between 10 and 30% by volume of the total pore volume of the support; —the volume of mesopores having a diameter greater than or equal to 18 nm and less than 50 nm is between 30 and 50% by volume of the total pore volume of the support; —the volume of macropores having a diameter greater than or equal to 50 nm and less than 8000 nm is between 30 and 50% by volume of the total pore volume of the support.

17 Claims, No Drawings

METHOD FOR CONDUCTING FINISHING HYDRODESULPHURISATION IN THE PRESENCE OF A CATALYST ON A MESO-MACROPOROUS SUPPORT

TECHNICAL FIELD

The present invention relates to the field of hydrotreating gasoline cuts, notably gasoline cuts resulting from fluidized-bed catalytic cracking units. More particularly, the present invention relates to the use of a catalyst in a process for producing low-sulfur gasoline. The invention applies very particularly to the treatment of gasoline cuts containing olefins and sulfur, such as gasolines resulting from catalytic cracking, for which it is desired to reduce the content of sulfur compounds, without hydrogenating the olefins and the aromatics.

PRIOR ART

Automotive fuel specifications call for a significant reduction in the sulfur content in these fuels, and notably in gasolines. This reduction is notably directed toward limiting the content of sulfur and nitrogen oxides in motor vehicle exhaust gases. The specifications currently in force in Europe since 2009 for gasoline fuels set a maximum content of 10 ppm (parts per million) by weight of sulfur. Such specifications are also in force in other countries, for instance the United States and China, where the same maximum sulfur content has been required since January 2017. To achieve these specifications, it is necessary to treat gasolines via desulfurization processes.

The main sources of sulfur in gasoline bases are "cracking" gasolines, and mainly the gasoline fraction obtained from a process of catalytic cracking of an atmospheric or vacuum distillation residue of a crude oil. The gasoline fraction from catalytic cracking, which represents on average 40% of gasoline bases, in fact accounts for more than 90% of the sulfur in gasolines. Consequently, the production of low-sulfur gasolines requires a step of desulfurization of the catalytic cracking gasolines. Among the other sources of gasolines that may contain sulfur, mention may also be made of coker gasolines, visbreaker gasolines or, to a lesser extent, gasolines obtained from atmospheric distillation or steam cracking gasolines.

The removal of sulfur from gasoline cuts consists in specifically treating these sulfur-rich gasolines via desulfurization processes in the presence of hydrogen. These are then referred to as hydrodesulfurization (HDS) processes. However, these gasoline cuts, and more particularly the gasolines obtained from FCC, contain a large proportion of unsaturated compounds in the form of monoolefins (about 20% to 50% by weight) which contribute toward a good octane number, diolefins (0.5% to 5% by weight) and aromatics. These unsaturated compounds are unstable and react during the hydrodesulfurization treatment. Diolefins form gums by polymerization during the hydrodesulfurization treatments. This gum formation leads to gradual deactivation of the hydrodesulfurization catalysts or gradual clogging of the reactor. Consequently, the diolefins must be removed by hydrogenation before any treatment of these gasolines. Conventional treatment processes desulfurize gasolines non-selectively by hydrogenating a large portion of the monoolefins, giving rise to a high loss of octane number and high hydrogen consumption. The most recent hydrodesulfurization processes make it possible to desulfurize cracking gasolines rich in monoolefins, while at the same time limiting the hydrogenation of the monoolefins and consequently the loss of octane. Such processes are described, for example, in EP-A-1077247 and EP-A-1174485.

However, when very deep desulfurization of cracking gasolines needs to be performed, some of the olefins present in the cracking gasolines are hydrogenated, on the one hand, and recombine with $H_2S$ to form mercaptans, on the other hand. This family of compounds, of chemical formula R—SH where R is an alkyl group, are generally called recombined mercaptans, and generally represent between 20% by weight and 80% by weight of the residual sulfur in desulfurized gasolines. Reduction of the content of recombined mercaptans may be achieved by catalytic hydrodesulfurization, but this leads to the hydrogenation of a large portion of the monoolefins present in the gasoline, which then leads to a large reduction in the octane number of the gasoline and also to an overconsumption of hydrogen. It is moreover known that the loss of octane due to the hydrogenation of the monoolefins during the hydrodesulfurization step is proportionately greater the lower the targeted sulfur content, i.e. when it is sought to thoroughly remove the sulfur compounds present in the feedstock.

It is thus possible to treat the gasoline by a sequence of two reactors as described in document EP 1 077 247; the aim of the first stage, also called the selective HDS stage, is generally to carry out a deep desulfurization of the gasoline with minimal olefin saturation (and no aromatic loss), resulting in a maximum octane retention. The catalyst employed is generally a catalyst of CoMo type. During this stage, new sulfur compounds are formed by recombination of the $H_2S$ resulting from the desulfurization and the olefins: recombined mercaptans.

The second stage generally has the role of minimizing the amount of recombined mercaptans. The temperature is generally higher in the second stage in order to thermodynamically promote the removal of the mercaptans. In practice, a furnace is thus placed between the two reactors in order to be able to raise the temperature of the second reactor to a temperature greater than that of the first.

The catalyst used in the polishing process must be particularly selective so as not to induce olefin saturation (and no aromatic loss) resulting in a loss of octane. It must therefore make it possible to reduce the contents of total sulfur and of mercaptans in hydrocarbon cuts, preferably in gasoline cuts, to very low contents, while minimizing the reduction in the octane number. Usually, the catalyst used is based on nickel.

Furthermore, it is known from the prior art that the pore distribution of the catalyst supports can have a beneficial impact on catalytic performance.

Document U.S. Pat. No. 6,589,908 discloses a process for preparing a catalyst support, which does not contain macroporosity and has a bimodal pore structure in the mesoporosity such that the two modes of porosity are separated by 1 to 20 nm. The support can be used in numerous catalytic applications, and notably in hydrotreating, notably in hydrodenitrogenation.

Document U.S. Pat. No. 5,266,300 discloses a method for preparing a porous alumina support for the use thereof as a hydrodesulfurization or hydrodemetallization catalyst support, said support comprising a total pore volume of between from 0.65 to 1.30 $cm^3/g$, said porous support comprising two populations of macropores, of which approximately 2% to 20% by volume, relative to the total pore volume, are in the form of macropores having a diameter of between 10 000 angströms and 100 000 angströms (1000 and 10 000 nm), approximately 5% to 30% by volume, relative to the total pore volume, are in the form of macropores having a diameter between 1000 angstroms and 10 000 angstroms (100 and 1000 nm), and approximately 50% to 93% by volume, relative to the total pore volume, are in the form of mesopores having a pore diameter of between 30 angstroms and 1000 angstroms (3-100 nm).

Documents CN108855197, CN104248987 and CN104248985 disclose catalysts for various catalytic applications (propane dehydrogenation, esterification), the support of which has a trimodal pore distribution, the mesopore populations being centered on three peaks respectively between 2 and 4 nm, 5 and 15 nm and 10 and 40 nm.

Document U.S. Pat. No. 7,790,130 discloses an alumina for halide scavenging comprising a trimodal porosity of which 40% to 49% by volume, relative to the total pore volume of the support, is in the form of pores having a diameter of between 15 and 50 nm.

However, none of the prior art documents describes the use of a process for treating a partially desulfurized, sulfur-containing hydrocarbon feedstock resulting from a preliminary step of catalytic hydrodesulfurization in the presence of a catalyst comprising a support having both a bimodal mesoporous porosity, with a high mesopore volume coupled with a specific macropore volume.

In this context, one of the objectives of the present invention is to provide a hydrodesulfurization process, and in particular a polishing stage of a two-step hydrodesulfurization process, in the presence of a supported catalyst having a performance in terms of reduction of the content of total sulfur and of mercaptans in hydrocarbon cuts which is at least as good as, indeed even better than, the processes known from the prior art, while minimizing the reduction in octane number.

The applicant has discovered that the use of a catalyst comprising an active phase based on at least one group VIII metal, said active phase not comprising any group VIB element, on a mesoporous and macroporous support, simultaneously having a bimodal mesoporous porosity, with a high mesopore volume coupled with a given macropore volume, has improved catalytic performance, in terms of catalytic activity and in terms of selectivity when it is used in a process for treating a partially desulfurized, sulfur-containing hydrocarbon feedstock resulting from a preliminary step of hydrodesulfurization. This results in a better conversion of the feedstock under identical operating conditions to those used in the prior art.

Specifically, without being bound to any scientific theory, the use of such a catalyst in a process for treating a partially desulfurized, sulfur-containing hydrocarbon feedstock resulting from a preliminary step of catalytic hydrodesulfurization, improves the phenomena of internal diffusion of reactants and products by the presence of populations of different sizes of mesopores. In addition, the combined presence of macroporosity is particularly well advised when the feedstock to be treated contains a significant amount of reactive olefins (unsaturated compounds), notably diolefins, which is the case for gasolines, which can give rise to the formation of gums and thus block the porosity of the catalyst without the presence of macroporosity.

SUBJECTS OF THE INVENTION

The present invention relates to a process for treating a partially desulfurized, sulfur-containing hydrocarbon feedstock resulting from a preliminary step of catalytic hydrodesulfurization, said process being carried out at a temperature of between 200° C. and 400° C., a pressure of between 0.2 and 5 MPa, at an hourly space velocity, defined as the volume flow rate of feedstock at the inlet per volume of catalyst used, of between 0.1 $h^{-1}$ and 20 $h^{-1}$, in the presence of a catalyst comprising an active phase comprising at least one group VIII metal, said active phase not comprising any group VIB metal, and a mesoporous and macroporous alumina support comprising a bimodal distribution of mesopores and wherein:

the volume of mesopores with a diameter greater than or equal to 2 nm and less than 18 nm corresponds to between 10% and 30% by volume of the total pore volume of said support;

the volume of mesopores with a diameter greater than or equal to 18 nm and less than 50 nm corresponds to between 30% and 50% by volume of the total pore volume of said support;

the volume of macropores with a diameter greater than or equal to 50 nm and less than 8000 nm corresponds to between 30% and 50% by volume of the total pore volume of said support.

According to one or more embodiments, said support comprises a specific surface area of between 50 and 210 $m^2/g$.

According to one or more embodiments, said support comprises a total pore volume of between 0.7 and 1.3 ml/g.

According to one or more embodiments, the volume of mesopores with a diameter greater than or equal to 2 nm and less than 18 nm corresponds to between 15% and 25% by volume of the total pore volume of said support.

According to one or more embodiments, the volume of mesopores with a diameter greater than or equal to 18 nm and less than 50 nm corresponds to between 35% and 45% by volume of the total pore volume of said support.

According to one or more embodiments, the volume of macropores with a diameter greater than or equal to 50 nm and less than 8000 nm corresponds to between 35% and 50% by volume of the total pore volume of said support.

According to one or more embodiments, the content of group VIII metal in said catalyst, expressed as group VIII element, is between 5% and 65% by weight, relative to the total weight of said catalyst.

According to one or more embodiments, the group VIII metal is nickel.

According to one or more embodiments, the pore distribution of the mesopores with a diameter greater than or equal to 2 nm and less than 18 nm is centered on a range of values of between 10.5 and 14.5 nm.

According to one or more embodiments, the pore distribution of the mesopores with a diameter greater than or equal to 18 nm and less than 50 nm is centered on a range of values of between 22 and 28 nm.

According to one or more embodiments, said support comprises a specific surface area of between 70 and 180 $m^2/g$.

According to one or more embodiments, said support is in the form of beads with a diameter of between 2 and 4 mm.

According to one or more embodiments, when said support is in the form of beads, said support is obtained according to the following steps:

s1) dehydrating an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;

s2) shaping said alumina powder obtained in step s1) in the form of beads;

s3) heat treating the alumina beads obtained in step s2) at a temperature above or equal to 200° C.;

s4) hydrothermally treating the alumina beads obtained at the end of step s3) by impregnation with water or an aqueous solution, then residence in an autoclave at a temperature of between 100° C. and 300° C.;

s5) calcining the alumina beads obtained at the end of step s4) at a temperature of between 500° C. and 820° C.

According to one or more embodiments, said partially desulfurized hydrocarbon feedstock contains less than 100 ppm by weight of sulfur.

DETAILED DESCRIPTION OF THE INVENTION

1. Definitions

In the text hereinbelow, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

The BET specific surface area is measured by nitrogen physisorption according to the standard ASTM D3663-03, a method described in the work by Rouquerol F., Rouquerol J. and Singh K., "*Adsorption by Powders & Porous Solids*: Principles, Methodology and Applications", Academic Press, 1999.

In the present description, according to the IUPAC convention, "micropores" are understood to mean the pores having a diameter of less than 2 nm, i.e. 0.002 µm; "mesopores" are understood to mean the pores having a diameter of greater than 2 nm, i.e. 0.002 µm, and less than 50 nm, i.e. 0.05 µm, and "macropores" are understood to mean the pores having a diameter of greater than or equal to 50 nm, i.e. 0.05 µm.

In the following description of the invention, the "total pore volume" of the alumina or of the catalyst is understood to mean the volume measured by mercury porosimetry according to the standard ASTM D4284-83 at a maximum pressure of 4000 bar (400 MPa), using a surface tension of 484 dyne/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-5, written by Jean Charpin and Bernard Rasneur.

In order to obtain better accuracy, the value of the total pore volume in ml/g that is given in the text which follows corresponds to the value of the total mercury volume (total pore volume measured by mercury intrusion porosimetry) in ml/g measured on the sample minus the value of the mercury volume in ml/g measured on the same sample for a pressure corresponding to 30 psi (approximately 0.2 MPa).

The volume of the macropores and of the mesopores is measured by mercury intrusion porosimetry according to the standard ASTM D4284-83 at a maximum pressure of 4000 bar (400 MPa), using a surface tension of 484 dyne/cm and a contact angle of 140°.

The value at and above which the mercury fills all the intergranular voids is set at 0.2 MPa and it is considered that, above this value, the mercury penetrates into the pores of the sample.

The macropore volume of the catalyst is defined as being the cumulative volume of mercury introduced at a pressure of between 0.2 MPa and 30 MPa, corresponding to the volume contained in the pores with an apparent diameter of greater than 50 nm.

The mesopore volume of the catalyst is defined as being the cumulative volume of mercury introduced at a pressure of between 30 MPa and 400 MPa, corresponding to the volume contained in the pores with an apparent diameter of between 2 and 50 nm.

When the incremental pore volume measured by mercury porosimetry is plotted as a function of the pore diameter, the porosity modes correspond to the inflection points of the function represented.

The contents of group VIII elements and of phosphorus are measured by X-ray fluorescence.

2. Description

Polishing Hydrodesulfurization Process

According to the invention, a process is carried out for treating a partially desulfurized, sulfur-containing hydrocarbon feedstock resulting from a preliminary step of catalytic hydrodesulfurization, in which said feedstock to be treated is brought into contact with a polishing catalyst. The hydrodesulfurization step, known as a polishing hydrodesulfurization step, is mainly carried out in order to at least partly decompose the recombined mercaptans into olefins and $H_2S$, but it also makes it possible to hydrodesulfurize the more refractory sulfur compounds whereas the first hydrodesulfurization step is mainly carried out in order to convert a large portion of the sulfur compounds into $H_2S$. The remaining sulfur compounds are essentially refractory sulfur compounds and the recombined mercaptans resulting from the addition of the $H_2S$ formed. The polishing hydrodesulfurization process is generally carried out at a temperature of between 280° C. and 400° C., preferably between 300° C. and 380° C., preferably between 310° C. and 370° C. The temperature of this polishing step is generally at least 5° C., preferably at least 10° C. and very preferably at least 30° C. higher than the temperature of the first hydrodesulfurization step.

The process is generally carried out at an hourly space velocity (which is defined as the volume flow rate of feedstock at the inlet per volume of catalyst used) of between 1 $h^{-1}$ and 10 $h^{-1}$, preferably between 1 $h^{-1}$ and 8 $h^{1}$.

The process is generally carried out at with a hydrogen flow rate such that the ratio between the hydrogen flow rate expressed in normal $m^3$ per hour ($Nm^3/h$) and the flow rate of feedstock to be treated expressed in $m^3$ per hour under standard conditions is between 10 $Nm^3/m^3$ and 4000 $Nm^3/m^3$, preferably between 50 $Nm^3/m^3$ and 1000 $Nm^3/m^3$.

The process is generally carried out at a pressure of between 0.5 MPa and 5 MPa, preferably between 1 MPa and 3 MPa.

The partially desulfurized, sulfur-containing hydrocarbon feedstock is preferably a gasoline containing olefinic compounds, preferably a gasoline cut obtained from a catalytic cracking process. The treated hydrocarbon feedstock generally has a boiling point below 350° C., preferably below 300° C. and very preferably below 250° C. Preferably, the hydrocarbon feedstock contains less than 100 ppm by weight of sulfur, notably derived from organic compounds, and preferably less than 50 ppm by weight of sulfur, notably derived from organic compounds, in particular in the form of recombined mercaptans and refractory sulfur compounds.

The feedstock to be treated is subjected to a partial desulfurization treatment before said polishing step. This preliminary treatment consists in bringing the sulfur-containing hydrocarbon feedstock into contact with hydrogen, in one or more hydrodesulfurization reactors in series, containing one or more catalysts suitable for carrying out the hydrodesulfurization. Preferably, the operating pressure of this step is generally between 0.5 MPa and 5 MPa, and very preferably between 1 MPa and 3 MPa, and the temperature is generally between 200° C. and 400° C., and very preferably between 220° C. and 380° C. Preferably, the amount of catalyst used in each reactor is generally such that the ratio between the flow rate of gasoline to be treated, expressed in $m^3$ per hour under standard conditions, per $m^3$ of catalyst is between 0.5 h−1 and 20 h−1, and very preferably between 1 $h^{-1}$ and 10 $h^1$. Preferably, the hydrogen flow rate is generally such that the ratio between the hydrogen flow rate expressed in normal $m^3$ per hour ($Nm^3/h$) and the flow to be treated expressed in $m^3$ per hour under standard conditions is between 50 $Nm^3/m^3$ and 1000 $Nm^3/m^3$, preferably between 70 $Nm^3/m^3$ and 800 $Nm^3/m^3$. Preferably, this step will be carried out for the purpose of performing hydrodesulfurization selectively, i.e. with a degree of hydrogenation of the monoolefins of less than 80% by weight, preferably less than 70% by weight and very preferably less than 60% by weight.

The degree of desulfurization achieved during this hydrodesulfurization step is generally greater than 50% and preferably greater than 70%, such that the hydrocarbon fraction used in the polishing process contains less than 100 ppm by weight of sulfur and preferably less than 50 ppm by weight of sulfur.

Any hydrodesulfurization catalyst may be used in the preliminary hydrodesulfurization step. Preferably, use is made of catalysts which have high selectivity with respect to the hydrodesulfurization reactions, in comparison with the olefin hydrogenation reactions. Such catalysts comprise at least one porous and amorphous mineral support, a group VIB metal, a group VIII metal. The group VIB metal is preferentially molybdenum or tungsten and the group VIII metal is preferentially nickel or cobalt. The support is generally selected from the group constituted by aluminas, silica, silica-aluminas, silicon carbide, titanium oxides, alone or as a mixture with alumina or silica-alumina, and magnesium oxides, alone or as a mixture with alumina or silica-alumina. Preferably, the support is selected from the group constituted by aluminas, silica and silica-aluminas. Preferably, the hydrodesulfurization catalyst used in the additional hydrodesulfurization step(s) has the following features:
  the content of group VIB elements is between 1% and 20% by weight of oxides of group VIB elements relative to the total weight of the catalyst;
  the content of group VIII elements is between 0.1% and 20% by weight of oxides of group VIII elements relative to the total weight of the catalyst;
  the (group VIII elements/group VIB elements) molar ratio is between 0.1 and 0.8.

A very preferred hydrodesulfurization catalyst comprises cobalt and molybdenum and has the abovementioned features. Furthermore, the hydrodesulfurization catalyst may comprise phosphorus. In this case, the phosphorus content is preferably between 0.1% and 10% by weight of $P_2O_5$, relative to the total weight of catalyst, and the molar ratio of phosphorus to group VIB elements is greater than or equal to 0.25, preferably greater than or equal to 0.27.

At the end of the hydrodesulfurization step, the effluent may be subjected to a step of separation of the hydrogen and $H_2S$ by any method known to those skilled in the art (disengager, stabilization column, etc.).

Catalyst

The active phase of the catalyst used in the context of the process according to the invention comprises, preferably consists of, an active phase based on at least one group VIII metal, said active phase not comprising any group VIB metal.

Preferably, the group VIII metal is nickel.

Preferably, the active phase of at least one group VIII metal is in sulfide form. The active phase of at least one group VIII metal that is in sulfide form denotes, in the present application, the chemical compounds of $M_xS_y$ type, where M is a group VIII metal with $0.5 \leq x/y \leq 2$, preferably x=1 and y=1 or else x=3 and y=2. When the group VIII metal is nickel, the the most common compounds are NiS in hexagonal or rhombohedral form or else $Ni_3S_2$. When the group VIII metal is nickel, the nickel sulfide phase diagram has a large number of sulfur-rich and nickel-rich phases at low temperature. Various nickel sulfide phases and stoichiometries are therefore possible, ranging from nickel-rich compounds such as $Ni_3S_2$, $Ni_6S_5$, $Ni_7S_6$, $Ni_9S_8$ and NiS to sulfur-rich compounds like $Ni_3S_4$ and $NiS_2$. It should be noted that NiS is also known to exist in two main phases, namely the hexagonal α-NiS, which is stable at high temperatures, and the rhombohedral β-NiS, which is stable at low temperature. The existence of these numerous phases makes the synthesis of nickel sulfide in the form of a single phase complex, the products therefore often being mixtures of two or more phases.

The content of group VIII, expressed as group VIII element, is preferably between 5% and 65% by weight relative to the total weight of the catalyst, preferably between 8% and 55% by weight, even more preferably between 12% and 40% by weight, and particularly preferably between 12% and 34% by weight.

The catalyst generally comprises a specific surface area of between 50 and 200 $m^2/g$, preferably between 60 and 170 $m^2/g$ and preferably between 70 and 130 $m^2/g$.

The pore volume of the catalyst is generally between 0.5 ml/g and 1.3 ml/g, and preferably between 0.6 ml/g and 1.1 ml/g.

Alumina Support

The alumina support of the catalyst used in the context of the hydrodesulfurization process according to the invention is a macroporous and mesoporous alumina support comprising a bimodal distribution of mesopores, wherein:
  the volume of mesopores with a diameter greater than or equal to 2 nm and less than 18 nm corresponds to between 10% and 30% by volume of the total pore volume of said support;
  the volume of mesopores with a diameter greater than or equal to 18 nm and less than 50 nm corresponds to between 30% and 50% by volume of the total pore volume of said support;
  the volume of macropores with a diameter greater than or equal to 50 nm and less than 8000 nm corresponds to between 30% and 50% by volume of the total pore volume of said support. Preferably, the volume of the mesopores of the support with a diameter greater than or equal to 2 nm and less than 18 nm corresponds to between 15% and 25% by volume of the total pore volume of said support.

Preferably, the volume of the mesopores of the support with a diameter greater than or equal to 18 nm and less than 50 nm corresponds to between 35% and 45% by volume of the total pore volume of said support.

Preferably, the volume of the macropores of the support with a diameter greater than or equal to 50 nm and less than 8000 nm corresponds to between 35% and 50% by volume of the total pore volume of said support.

In one embodiment according to the invention, the pore distribution of the mesopores with a diameter greater than or equal to 2 nm and less than 18 nm is centered on a range of values of between 10.5 and 14.5 nm, preferably between 12 and 13 nm.

In one embodiment according to the invention, the pore distribution of the mesopores with a diameter greater than or equal to 18 nm and less than 50 nm is centered on a range of values of between 22 and 28 nm, preferably between 23 and 27 nm.

The support generally comprises a specific surface area of between 50 and 210 $m^2/g$, preferably between 70 and 180 $m^2/g$ and even more preferably between 70 and 160 $m^2/g$.

The pore volume of the support is generally between 0.7 ml/g and 1.3 ml/g, and preferably between 0.8 ml/g and 1.2 ml/g.

Advantageously, the support is in the form of beads with a diameter of between 0.8 and 10 mm, preferentially between 1 and 5 mm, and more preferentially between 2 and 4 mm.

Process for Preparing the Support

The alumina support of the catalyst used in the context of the treatment process according to the invention can be synthesized by any method known to those skilled in the art.

According to a preferred embodiment, the alumina support used according to the invention is in the form of beads. According to this preferred embodiment, the preparation of the support comprises the following steps:
s1) dehydrating an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;
s2) shaping said alumina powder obtained in step s1) in the form of beads;
s3) heat treating the alumina beads obtained in step s2) at a temperature above or equal to 200° C.;
s4) hydrothermally treating the alumina beads obtained at the end of step s3) by impregnation with water or an aqueous solution, preferentially an acidic aqueous solution, then residence in an autoclave at a temperature of between 100° C. and 300° C., preferably between 150° C. and 250° C.;
s5) calcining the alumina beads obtained at the end of step s4) at a temperature of between 500° C. and 820° C.

Steps s1) to s5) are described in detail below.

Step s1)

According to step s1), an aluminum hydroxide or an aluminum oxyhydroxide is dehydrated at a temperature of between 400° C. and 1200° C., preferably between 600° C. and 900° C., for a time of between 0.1 second and 5 seconds, preferably between 0.1 second and 4 seconds, to obtain an alumina powder. The aluminum hydroxide can be chosen from hydrargillite, gibbsite or bayerite. The aluminum oxyhydroxide can be chosen from boehmite or diaspore.

Preferably, step s1) is carried out by using hydrargillite.

Generally, step s1) is carried out in the presence of a stream of hot gas, such as dry air or moist air, making it possible to quickly remove and entrain the evaporated water.

Generally, the active alumina powder obtained after the dehydration of the aluminum hydroxide or oxyhydroxide is ground to a particle size of between from 10 to 200 μm.

Generally, the active alumina powder obtained after the dehydration of the aluminum hydroxide or oxyhydroxide is washed with water or an acidic aqueous solution. When the washing step is carried out with an acidic aqueous solution, any mineral or organic acid can be used, preferably nitric acid, hydrochloric acid, perchloric acid or sulfuric acid for the mineral acids, and a carboxylic acid (formic, acetic or malonic acid), a sulfonic acid (para-toluenesulfonic acid) or a sulfuric ester (lauryl sulfate) for the organic acids.

Step s2)

According to step s2), said alumina powder obtained at the end of step s1) is shaped.

The shaping of said alumina powder is carried out so as to obtain beads, which is referred to as granulation, and is generally carried out by means of a rotating technology, such as a rotating granulator or a rotating drum. This type of process makes it possible to obtain beads with a diameter and with pore distributions which are controlled, these dimensions and these distributions generally being created during the agglomeration step.

The porosity can be created by various means, such as the choice of the particle size distribution of the alumina powder or the agglomeration of several alumina powders with different particle size distributions. Another method consists in mixing, with the alumina powder, before or during the agglomeration step, one or more compounds, known as pore-forming compounds, which disappear by heating and which thus create a porosity in the beads. As pore-forming compounds used, mention may be made, by way of example, of wood flour, charcoal, activated carbon, carbon black, sulfur, tars, plastics or emulsions of plastics, such as polyvinyl chloride, polyvinyl alcohols, naphthalene or the like. The amount of pore-forming compounds added is determined by the volume desired to obtain beads with a green filling density of between 500 and 1100 $kg/m^3$, preferentially between 700 and 950 $kg/m^3$, and with a diameter of between 0.8 and 10 mm, preferentially between 1 and 5 mm, and even more preferentially between 2 and 4 mm. The beads obtained can be selected by screening according to the desired particle size.

Step s3)

According to step s3), a heat treatment of the alumina powder shaped in the form of beads obtained on conclusion of step s2) is carried out at a temperature above or equal to 200° C., preferably of between 200° C. and 1200° C., preferentially between 300° C. and 900° C., very preferentially between 400° C. and 750° C., for a period of time of generally between 1 and 24 hours, preferably between 1 and 6 hours. The beads obtained in this intermediate step comprise a specific surface area of between 50 and 420 $m^2/g$, preferably between 60 and 350 $m^2/g$, and even more preferentially between 80 and 300 $m^2/g$.

Step s4)

According to step s4), the alumina beads obtained on conclusion of step s3) are subjected to a hydrothermal treatment by impregnation with water or an aqueous solution, preferentially an acidic aqueous solution, then residence in an autoclave at a temperature of between 100° C. and 300° C., preferably between 150° C. and 250° C.

The hydrothermal treatment is generally carried out at a temperature of from 100° C. to 300° C., preferentially from 150° C. to 250° C., for a period of time of greater than 45 minutes, preferentially from 1 to 24 hours, very preferentially from 1.5 to 12 hours. The hydrothermal treatment is generally carried out using an acidic aqueous solution comprising one or more mineral and/or organic acids, preferably nitric acid, hydrochloric acid, perchloric acid, sulfuric acid or weak acids, the solution of which has a pH of less than 4, such as acetic acid or formic acid. Generally, said acidic aqueous solution also comprises one or more compounds capable of releasing anions capable of combining with aluminum ions, preferably compounds comprising a nitrate ion (such as aluminum nitrate), chloride, sulfate, perchlorate, chloroacetate, trichloroacetate, bromoacetate or dibromoacetate ion, and the anions of general formula: R—COO, such as formates and acetates.

Step s5)

According to step s5), the alumina beads obtained on conclusion of step s4) are calcined at a temperature of between 500° C. and 820° C., preferentially between 550° C. and 750° C., and for a period of time of generally between 1 hour and 24 hours, preferably between 1 hour and 6 hours. On conclusion of this step, the alumina beads obtained comprise a specific surface area of between 50 and 210 $m^2/g$, preferably between 70 and 180 $m^2/g$ and even more preferentially between 70 and 160 $m^2/g$.

Process for Preparing the Catalyst

The catalyst used in the context of the hydrodesulfurization process according to the invention is obtained by a preparation process comprising at least the following steps:
 a) the alumina support is brought into contact with at least one metal salt in solution comprising at least one group VIII metal;
 b) a step of drying the solid obtained on conclusion of step a) is carried out at a temperature below 200° C. in order to obtain a dried catalyst precursor;
 c) optionally, the dried catalyst precursor obtained on conclusion of step b) is calcined at a temperature above or equal to 200° C. and below or equal to 1100° C. under an inert atmosphere or under an oxygen-containing atmosphere in order to obtain a calcined catalyst precursor;
 d) optionally, the catalyst precursor obtained on conclusion of step b), or optionally on conclusion of step c), is reduced in order to obtain a reduced catalyst precursor,
 e) optionally, the catalyst precursor obtained on conclusion of step b), or optionally on conclusion of step c) or d), is sulfided.

The steps of the process for the preparation of the catalyst are described in detail below.

Step a)

According to step a), the porous support is brought into contact with a metal salt in solution comprising at least one group VIII metal. According to step a), said porous support and the metal salt in solution may be brought into contact by any method known to those skilled in the art. Preferably, said step a) is carried out by dry impregnation, which consists in bringing the porous support into contact with a volume of said solution of between 0.25 and 1.5 times the pore volume of the support. Said solution containing at least one metal salt comprising at least one group VIII metal can be aqueous or organic, preferably aqueous.

According to step a), at least one metal salt comprising at least one metal belonging to group VIII metal is provided. Preferably, the metal is nickel. Preferably, the metal salt is hydrated. Preferably, the metal salt is a hydrated nitrate salt. Preferably, the metal salt is nickel nitrate hexahydrate (Ni$(NO_3)_2 \cdot 6H_2O$.

Step b)

According to step b), a step of drying the solid obtained on conclusion of step a) is carried out at a temperature below 200° C. in order to obtain a dried catalyst precursor. Preferably, the drying is carried out at a temperature between 50° C. and 180° C., preferably between 70° C. and 150° C., very preferably between 75° C. and 130° C. The drying step is preferentially carried out for a period typically of between 10 minutes and 24 hours. Longer periods of time are not ruled out, but do not necessarily provide any improvement.

The drying step may be carried out by any technique known to those skilled in the art. It is advantageously carried out at atmospheric pressure or at reduced pressure. Preferably, this step is carried out at atmospheric pressure. It is advantageously carried out using hot air or any other hot gas. Preferably, the gas used is either air, or an inert gas such as argon or nitrogen. Very preferably, the drying is carried out in the presence of nitrogen and/or air.

Step c) (Optional Step)

According to step c), the solid obtained in step b) is subjected to a calcination treatment at a temperature above or equal to 200° C. and below or equal to 1100° C., preferably between 250° C. and 650° C., and very preferably between 300° C. and 500° C., under an inert atmosphere (nitrogen for example) or under an oxygen-containing atmosphere (air, for example). The duration of this heat treatment is generally less than 16 hours, preferably less than 5 hours. After this treatment, the group VIII element is in oxide form and the solid no longer contains or contains very few counterions and water of crystallization that were initially present in the metal salt. The calcining step may be carried out by any technique known to those skilled in the art. It is advantageously performed in a traversed bed or in a fluidized bed using hot air or any other hot gas. A calcined catalyst precursor is obtained.

Step d) (Optional Step)

Prior to the sulfidation of the catalyst, at least one reducing treatment step is carried out in the presence of a reducing gas after step b), optionally after step c), so as to obtain a catalyst comprising at least one group VIII metal at least partially in metal form. This treatment makes it possible to form metal particles, in particular particles of group VIII metal in the zero-valent state. The reducing gas is preferably hydrogen. The hydrogen may be used pure or as a mixture (for example a hydrogen/nitrogen, hydrogen/argon or hydrogen/methane mixture). In the case where the hydrogen is used as a mixture, any proportion may be envisaged. Said reducing treatment is preferentially performed at a temperature of between 120 and 500° C., preferably between 150 and 450° C. The duration of the reducing treatment is generally between 2 and 40 hours, preferably between 3 and 30 hours. The rise in temperature up to the desired reduction temperature is generally slow, for example set between 0.1 and 10° C./min, preferably between 0.3 and 7° C./min. A reduced catalyst precursor is obtained.

Step e)

After step b) or after the optional steps c) or d), the product obtained (catalyst precursor, dried, calcined or reduced) is advantageously sulfided so as to form the group VIII metal sulfide. This sulfidation is carried out by methods well known to those skilled in the art, and advantageously under a sulfo-reductive atmosphere in the presence of hydrogen and hydrogen sulfide. The sulfidation is carried out by injecting, onto the catalyst, a stream containing $H_2S$ and hydrogen, or else a sulfur compound capable of decomposing to $H_2S$ in the presence of the catalyst and hydrogen. Polysulfides, such as dimethyl disulfide, are $H_2S$ precursors commonly used to sulfide the catalyst. The temperature is adjusted in order for the $H_2S$ to react with the group VIII metal to form the group VIII metal sulfide. This sulfidation can be carried out in situ or ex situ (inside or outside the reactor of the polishing process). Advantageously, it is carried out ex situ. Generally it is carried out at temperatures of between 200° C. and 600° C. and more preferentially between 250° C. and 500° C. In order to be active, the group VIII metal should preferably be substantially sulfided. The sulfidation operating conditions, notably the nature of the sulfiding agent, the $H_2S$/hydrogen ratio, the temperature and the duration of the sulfidation will preferably be adapted depending on the product obtained after step b) or after the optional steps c) or d), so as to obtain a good sulfidation of the group VIII metal, i.e., the group VIII metal is mostly and preferably entirely sulfided.

The degree of sulfidation of the metals constituting the active phase of said catalyst is advantageously at least equal to 60%, preferably at least equal to 80%. The sulfur content in the sulfided material is measured by elemental analysis according to ASTM D5373. A metal is regarded as sulfided when the overall degree of sulfidation, defined by the molar ratio of the sulfur (S) present on said catalyst to said metal, is at least equal to 60% of the theoretical molar ratio corresponding to the complete sulfidation of the metal(s) under consideration. The overall degree of sulfidation is defined by the following equation:

$$(S/\text{élément})_{catalyst} \geq 0.6 \times (S/\text{élément})_{theoretical}$$

in which:
- $(S/\text{metal})_{catalyst}$ is the molar ratio of sulfur (S) to metal present on the catalyst;
- $(S/\text{metal})_{theoretical}$ is the molar ratio of sulfur to metal corresponding to the complete sulfidation of the metal to give sulfide.

This theoretical molar ratio varies according to the metal under consideration:

$$(S/Ni)_{theoretical} = 1/1$$

The invention is illustrated by the examples that follow.

EXAMPLES

Example 1: Catalyst A (According to the Invention)

The support S1 of the catalyst A is obtained by dehydration of hydrargillite (Emplura®, Merck™) in order to obtain an alumina powder. The temperature is set at 800° C. and the contact time of the material to be dehydrated with a flow of dry air is 1 second. The alumina powder obtained is ground to a particle size of between from 10 to 200 μm and then washed three times with a volume of distilled water equal to twice the volume of the powder used. Said alumina powder is shaped in the presence of carbon black (N990 Thermax®) with a disk pelletizer (GRELBEX™ P30) equipped with a conical cylindrical pan at an angle of 30° and a rotation speed of 40 rpm so as to obtain beads with a diameter predominantly between 2 and 4 mm after screening the solid. The amount of carbon black is adjusted to obtain a green filling density of the objects of 800 kg/m³. Said beads are subjected to a heat treatment in air at 720° C. so as to give them a specific surface area of 200 m²/g. Next, a hydrothermal treatment is applied to said beads by impregnation of the pore volume with an aqueous solution of nitric acid (0.1 N, Merck™). The hydrothermal treatment is carried out at a temperature of 200° C. for 6.5 hours, in a rotating basket autoclave. The beads thus obtained are subjected to a final calcination treatment in air at 650° C. for 2 hours. The support S1 has a specific surface area of 141 m²/g, a total pore volume of 0.97 ml/g, and also the following pore distribution given by mercury porosimetry:
- a volume of mesopores with a diameter greater than or equal to 2 nm and less than 18 nm, the pore distribution of which is centered on 13 nm, of 0.15 ml/g corresponding to 15% of the total pore volume;
- a volume of mesopores with a diameter greater than or equal to 18 nm and less than 50 nm, the pore distribution of which is centered on 26 nm, of 0.43 ml/g corresponding to 44% of the total pore volume;
- a volume of macropores with a diameter greater than or equal to 50 nm and less than 8000 nm, of 0.39 ml/g corresponding to 40% of the total pore volume.

The support S1 exhibits a water uptake volume of 0.95 ml/g. The impregnation solution is prepared by diluting 8.24 grams of nickel nitrate ($Ni(NO_3)_2 \cdot 6H_2O$, 99.5%, Merck™) in 37.2 ml of distilled water. After dry impregnation of 40 g of support and a step of maturing for 12 hours in a moisture-saturated atmosphere, the solid is dried at 120° C. for 12 hours. A catalyst precursor is obtained. A second impregnation step is carried out with a solution prepared by diluting 22.64 g of nickel nitrate ($Ni(NO_3)_2 \cdot 6H_2O$, 99.5%, Merck™) in 33.7 ml of distilled water. After dry impregnation of the catalyst precursor and a step of maturing for 12 hours in a moisture-saturated atmosphere, the solid is dried at 120° C. for 12 hours. The solid is subsequently calcined in air at 450° C. for 2 hours. The calcined catalyst thus obtained is denoted A. The final composition in metals of the catalyst, expressed in the form of oxides and relative to the weight of the dry catalyst, is then as follows: NiO=17.0±0.2% by weight relative to the total weight of the catalyst (i.e. a content of Ni element of 13.4% by weight). Catalyst A has a total pore volume of 0.88 ml/g and a specific surface area of 118 m²/g.

Example 2: Catalyst B not in Accordance with the Invention (Catalyst with macropores and a Monomodal Distribution of Large Mesopores)

The support S2 of the catalyst B is prepared by dehydration of hydrargillite (Emplura®, Merck) in order to obtain an active alumina powder. The temperature is set at 800° C. and the contact time of the material to be dehydrated with a flow of dry air is 1 second. The active alumina powder obtained is ground to a particle size of between from 10 to 200 μm and then washed three times with a volume of distilled water equal to twice the volume of the powder used. Said active alumina powder is shaped with a disk pelletizer (GRELBEX™ P30) equipped with a conical cylindrical pan at an angle of 30° and a rotation speed of 40 rpm so as to obtain beads with a diameter predominantly between 2 and 4 mm (after screening the solid) and a green filling density of the objects of 780 kg/m³. Said beads are subjected to a heat treatment in air at 700° C. so as to give them a specific surface area of 250 m²/g. Next, a hydrothermal treatment is applied to said beads by impregnation of the pore volume with an aqueous solution of nitric acid (0.1 N, Merck™). The hydrothermal treatment is carried out at a temperature of 200° C. for 6.5 hours, in a rotating basket autoclave. The beads thus obtained are subjected to a final calcination treatment in air at 950° C. for 2 hours. The support S2 has a specific surface area of 71 m²/g, a total pore volume of 0.56 ml/g, and also the following pore distribution given by mercury porosimetry:

a volume of mesopores with a diameter greater than or equal to 10 nm and less than 50 nm, the pore distribution of which is centered on 20 nm, of 0.35 ml/g corresponding to 63% of the total pore volume;

a volume of macropores with a diameter greater than or equal to 50 nm and less than 8000 nm, of 0.21 ml/g corresponding to 38% of the total pore volume.

The support S2 exhibits a water uptake volume of 0.54 ml/g. The impregnation solution is prepared by diluting 8.24 g of nickel nitrate hexahydrate (Sigma-Aldrich™, purity ≥98.5%) in 21.1 ml of distilled water. After dry impregnation of 40 g of support and a step of maturing for 12 hours in a moisture-saturated atmosphere, the solid is dried at 120° C. for 12 hours. A catalyst precursor is obtained. A second impregnation step is carried out on the catalyst precursor with a solution prepared by diluting 22.64 g of nickel nitrate ($Ni(NO_3)_2 \cdot 6H_2O$, 99.5%, Merck™) in 18.1 ml of distilled water. The solid is then calcined under air at 450° C. for 2 hours. The calcined catalyst thus obtained is denoted B. The final composition in metals of the catalyst, expressed in the form of oxides and relative to the weight of the dry catalyst, is then as follows: NiO=17.0±0.2% by weight (i.e. a content of Ni element of 13.4% by weight). Catalyst B has a total pore volume of 0.46 ml/g and a specific surface area of 56 m²/g.

Example 3: Catalyst C not in Accordance with the Invention (Macroporous Catalyst)

A commercial support S3 (SA52124, UniSpheres® NorPro™) in the form of beads with a diameter of between 2 and 4 mm is provided. The support S3 has a specific surface of 8 m²/g, a total pore volume of 0.33 ml/g, and also the following pore distribution given by mercury porosimetry:

a volume of macropores with a diameter greater than or equal to 50 nm and less than 8000 nm, of 0.33 ml/g corresponding to 100% of the total pore volume.

The support S3 exhibits a water uptake volume of 0.47 ml/g. The impregnation solution is prepared by diluting 8.24 g of nickel nitrate hexahydrate (Sigma-Aldrich™, purity ≥98.5%) in 18.4 ml of distilled water. After dry impregnation of 40 g of support and a step of maturing for 12 hours in a moisture-saturated atmosphere, the solid is dried at 120° C. for 12 hours. A catalyst precursor is obtained. A second impregnation step is carried out with a solution prepared by diluting 22.64 g of nickel nitrate ($Ni(NO_3)_2 \cdot 6H_2O$, 99.5%, Merck™) in 15.8 ml of distilled water. After dry impregnation of the catalyst precursor and a step of maturing for 12 hours in a moisture-saturated atmosphere, the solid is dried at 120° C. for 12 hours. The solid is subsequently calcined in air at 450° C. for 2 hours. The calcined catalyst thus obtained is denoted C. The final composition in metals of the catalyst, expressed in the form of oxides and relative to the weight of the dry catalyst, is then as follows: NiO=17.0±0.2% by weight (i.e. a content of Ni element of 13.4% by weight). Catalyst C has a total pore volume of 0.28 ml/g and a specific surface area of 7 m²/g.

Example 4: Catalyst D not in Accordance with the Invention (Monomodal Mesoporous Catalyst)

A commercial support S4 (SA 6578, NorPro™) is supplied in the form of 5 mm-diameter extrudate. The support S4 has a specific surface area of 175 m²/g, a total pore volume of 0.82 ml/g, and also the following pore distribution given by mercury porosimetry:

a volume of mesopores with a diameter greater than or equal to 2 nm and less than or equal to 20 nm, the pore distribution of which is centered on 13 nm, of 0.82 ml/g corresponding to 100% of the total pore volume.

The support S4 exhibits a water uptake volume of 0.81 ml/g. The impregnation solution is prepared by diluting 8.24 g of nickel nitrate hexahydrate (Sigma-Aldrich™, purity ≥98.5%) in 31.7 ml of distilled water. After dry impregnation of 40 g of support and a step of maturing for 12 hours in a moisture-saturated atmosphere, the solid is dried at 120° C. for 12 hours. A catalyst precursor is obtained. A second impregnation step is carried out with a solution prepared by diluting 22.64 g of nickel nitrate ($Ni(NO_3)_2 \cdot 6H_2O$, 99.5%, Merck™) in 27.2 ml of distilled water. After dry impregnation of the catalyst precursor and a step of maturing for 12 hours in a moisture-saturated atmosphere, the solid is dried at 120° C. for 12 hours. The solid is subsequently calcined in air at 450° C. for 2 hours. The calcined catalyst thus obtained is denoted D. The final composition in metals of the catalyst, expressed in the form of oxides and relative to the weight of the dry catalyst, is then as follows: NiO=17.0±0.2% by weight (i.e. a content of Ni element of 13.4% by weight). Catalyst D has a total pore volume of 0.67 ml/g and a specific surface area of 142 m²/g.

Example 5: Catalyst E not in Accordance with the Invention (Catalyst with Macropores and a Monomodal Distribution of Small Mesopores)

A commercial support S5 (SA 6176, NorPro™) is supplied in the form of 1.6 mm-diameter extrudate. The support S5 has a specific surface area of 250 m²/g, a total pore volume of 1.05 ml/g, and also the following pore distribution given by mercury porosimetry:

a volume of mesopores with a diameter greater than or equal to 2 nm and less than or equal to 20 nm, the pore distribution of which is centered on 7 nm, of 0.68 ml/g corresponding to 65% of the total pore volume.

a volume of macropores with a diameter greater than or equal to 50 nm and less than 8000 nm, of 0.37 ml/g corresponding to 35% of the total pore volume.

The support S5 exhibits a water uptake volume of 1.02 ml/g. The impregnation solution is prepared by diluting 8.24 g of nickel nitrate hexahydrate (Sigma-Aldrich™, purity ≥98.5%) in 39.9 ml of distilled water. After dry impregnation of 40 g of support and a step of maturing for 12 hours in a moisture-saturated atmosphere, the solid is dried at 120° C. for 12 hours. A catalyst precursor is obtained. A second impregnation step is carried out with a solution prepared by diluting 22.64 g of nickel nitrate ($Ni(NO_3)_2 \cdot 6H_2O$, 99.5%, Merck™) in 34.2 ml of distilled water. After dry impregnation of the catalyst precursor and a step of maturing for 12 hours in a moisture-saturated atmosphere, the solid is dried at 120° C. for 12 hours. The solid is subsequently calcined in air at 450° C. for 2 hours. The calcined catalyst thus obtained is denoted E. The final composition in metals of the catalyst, expressed in the form of oxides and relative to the weight of the dry catalyst, is then as follows: NiO=17.0±0.2% by weight (i.e. a content of Ni element of 13.4% by weight). Catalyst E has a total pore volume of 0.87 ml/g and a specific surface area of 205 m²/g.

Example 6: Evaluation of the Performance of the Catalysts used in a Polishing Reactor of a Desulfurization Process The evaluation of the catalytic performance of solid A (in accordance with the invention) and solids B to E (not in accordance with the invention) is carried out using a model feedstock representative of a partially desulfurized catalytic cracking gasoline resulting from a preliminary step of catalytic hydrodesulfurization, containing 10% by weight of 2,3-dimethylbut-2-ene and 70 ppm S (including 42 ppm S from 1-hexanethiol and 28 ppm S from 3-methylthiophene). The solvent used is heptane.

The polishing reaction is carried out in a fixed traversed bed reactor under a total pressure of 1.5 MPa, at 270° C., at HSV=6 h$^{-1}$ (HSV=volume flow rate of feedstock/volume of catalyst) and an H$_2$/feedstock volume ratio of 300 Nl/l, in the presence of 4 ml of catalyst. Prior to the polishing reaction, the catalyst is sulfided in situ at 350° C. for 2 hours under a flow of hydrogen containing 15 mol % of H$_2$S at atmospheric pressure. Samples are taken at different time intervals and are analyzed by gas chromatography so as to observe the disappearance of the reactants and the formation of the products.

The catalytic performance of the catalysts is evaluated in terms of conversion of 3-methylthiophene and 1-hexanethiol.

| Catalyst | A (according to the invention) | B (comparative) | C (comparative) | D (comparative) | E (comparative) |
|---|---|---|---|---|---|
| Ni content (%) | 13.4 | 13.4 | 13.4 | 13.4 | 13.4 |
| Conversion of 1-hexanethiol (wt %) | 88% | 87% | 88% | 88% | 89% |
| Conversion of 3-methylthiophene (wt %) | 50% | 37% | 19% | 48% | 52% |
| Conversion of 2,3-dimethylbut-2-ene (wt %) | 5% | 4% | 2% | 10% | 15% |

The conversions of 3-methylthiophene observed with catalyst A are greater than those observed with comparative catalysts B and C, the conversions of 1-hexanethiol and 2,3-dimethylbut-2-ene being moreover substantially equivalent.

Compared with catalysts D and E, the conversions of 3-methylthiophene and of hexanethiol-1 observed with catalyst A are equivalent, the conversions of 2,3-dimethylbut-2-ene for catalyst A being moreover significantly lower. Catalyst A is therefore more selective than the comparative catalysts D and E.

This behavior of the catalyst according to the invention is particularly advantageous in the case of an implementation in a process for hydrodesulfurization of gasoline containing olefins for which it is sought to ensure deep desulfurization and to limit as much as possible the loss of octane due to the hydrogenation of the olefins.

The invention claimed is:

1. A process for treating a partially desulfurized, sulfur-containing hydrocarbon feedstock resulting from a preliminary step of catalytic hydrodesulfurization, said process comprising:
   subjecting said feedstock to partially desulfurization at a temperature of between 200° C. and 400° C., a pressure of between 0.2 and 5 MPa, at an hourly space velocity, defined as the volume flow rate of feedstock at the inlet per volume of catalyst used, of between 0.1 h$^{-1}$ and 20 h$^{-1}$, in the presence of a catalyst comprising an active phase comprising at least one group VIII metal, said active phase not comprising any group VIB metal, and a mesoporous and macroporous alumina support comprising a bimodal distribution of mesopores and wherein:
   the volume of mesopores with a diameter greater than or equal to 2 nm and less than 18 nm corresponds to between 10% and 30% by volume of the total pore volume of said support;
   the volume of mesopores with a diameter greater than or equal to 18 nm and less than 50 nm corresponds to between 30% and 50% by volume of the total pore volume of said support;
   the volume of macropores with a diameter greater than or equal to 50 nm and less than 8000 nm corresponds to between 30% and 50% by volume of the total pore volume of said support.

2. The process as claimed in claim 1, wherein said support comprises a specific surface area of between 50 and 210 m$^2$/g.

3. The process as claimed in claim 1, wherein said support comprises a total pore volume of between 0.7 and 1.3 ml/g.

4. The process as claimed in claim 1, wherein the volume of mesopores with a diameter greater than or equal to 2 nm and less than 18 nm corresponds to between 15% and 25% by volume of the total pore volume of said support.

5. The process as claimed in claim 1, wherein the volume of mesopores with a diameter greater than or equal to 18 nm and less than 50 nm corresponds to between 35% and 45% by volume of the total pore volume of said support.

6. The process as claimed in claim 1, wherein the volume of macropores with a diameter greater than or equal to 50 nm and less than 8000 nm corresponds to between 35% and 50% by volume of the total pore volume of said support.

7. The process as claimed in claim 1, wherein the content of group VIII metal in said catalyst, expressed as group VIII element, is between 5% and 65% by weight relative to the total weight of said catalyst.

8. The process as claimed in claim 1, wherein the group VIII metal is nickel.

9. The process as claimed in claim 1, wherein the pore distribution of the mesopores with a diameter greater than or equal to 2 nm and less than 18 nm is centered on a range of values of between 10.5 and 14.5 nm.

10. The process as claimed in claim 1, wherein the pore distribution of the mesopores with a diameter greater than or equal to 18 nm and less than 50 nm is centered on a range of values of between 22 and 28 nm.

11. The process as claimed in claim 1, wherein said support comprises a specific surface area of between 70 and 180 m²/g.

12. The process as claimed in claim 1, wherein said support is in the form of beads with a diameter of between 2 and 4 mm.

13. The process as claimed in claim 12, wherein said support is obtained according to the following steps:
- s1) dehydrating an aluminum hydroxide or an aluminum oxyhydroxide at a temperature of between 400° C. and 1200° C., for a time of between 0.1 second and 5 seconds, to obtain an alumina powder;
- s2) shaping said alumina powder obtained in step s1) in the form of beads;
- s3) heat treating the alumina beads obtained in step s2) at a temperature above or equal to 200° C.;
- s4) hydrothermally treating the alumina beads obtained at the end of step s3) by impregnation with water or an aqueous solution, then residence in an autoclave at a temperature of between 100° C. and 300° C.;
- s5) calcining the alumina beads obtained at the end of step s4) at a temperature of between 500° C. and 820° C.

14. The process as claimed in claim 1, wherein said partially desulfurized hydrocarbon feedstock contains less than 100 ppm by weight of sulfur.

15. The process as claimed in claim 13, wherein dehydrating in s1) is carried out at a temperature of between 600° C. and 900° C.

16. The process as claimed in claim 13, wherein dehydrating in s1) is carried out for a time of between 0.1 second and 4 seconds.

17. The process as claimed in claim 15, wherein dehydrating in s1) is carried out for a time of between 0.1 second and 4 seconds.

\* \* \* \* \*